Figure 1:
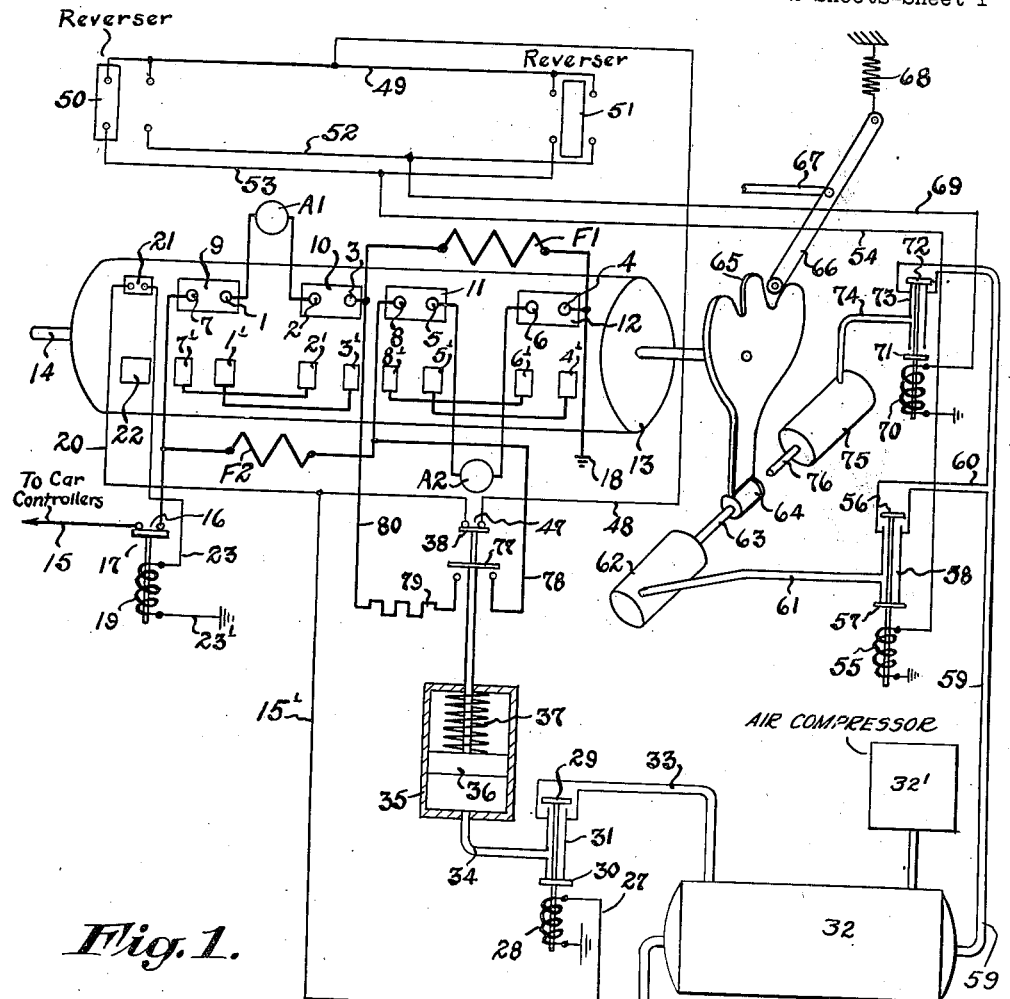
Figure 1:
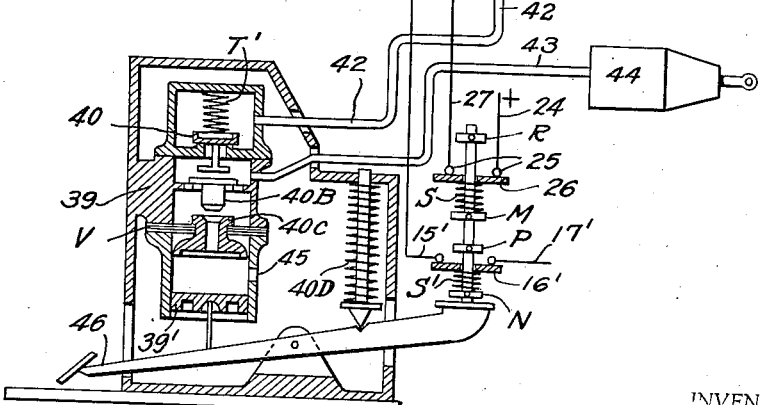

Dec. 23, 1941. J. S. McWHIRTER 2,267,122
COMBINATION ELECTRODYNAMIC AND AIR BRAKE
Filed Feb. 20, 1939 2 Sheets-Sheet 1

INVENTOR.
JOHN S. MC WHIRTER DECEASED
BY LILLIAN CHAPPEL MC WHIRTER EXECUTRIX
BY
Darby & Darby
ATTORNEY.

Patented Dec. 23, 1941

2,267,122

UNITED STATES PATENT OFFICE 2,267,122

COMBINATION ELECTRODYNAMIC AND AIR BRAKE

John S. McWhirter, Westport, Conn.; Lillian Chappell McWhirter executrix of said John S. McWhirter, deceased Application February 20, 1939, Serial No. 257,339

2 Claims. (Cl. 303—3)

This invention relates to a combination of a simultaneously acting electro-dynamic and air brake for use wherever such combination is capable of use, but particularly adapted to and disclosed for use on vehicles such as, for example, street cars.

The braking system as disclosed is illustrated in a form suitable for application to street cars. As will appear from the following disclosure, the combination includes electro-dynamic and air brakes interlocked by the air brake controller so that the dynamic brakes are always brought into use whenever the air brakes are used. In the system as illustrated the arrangement is such that the above combined application of the dynamic and air brakes results under all conditions, including normal operation and emergency operation and for either direction of movement of the vehicle.

An important object of the invention is the automatic interconnection of two or more vehicle driving motors in a manner to secure the full dynamic braking effect of both at all corresponding speeds upon each application of the application of the air brakes. A characteristic of this system is that both forms of brake are effective at all times so that the system does not have the undesirable characteristics resulting from a change over from one form of braking to another during a stop, as has been suggested in the prior art.

Another object of this invention involves cross-connecting circuits for the motors which have a common wire in which is included resistance or inductance which acts as an equalizer so that the electrical loads created in the motors are compelled to be equal during the braking action.

A still further object of the invention is the provision of a system wherein when the motors are cross-connected to produce dynamic braking to stop the forward motion of the vehicle there is also provided means for preventing the interruption of such circuits through the reverser whereby should the vehicle start to roll backwards a braking action results because the connections are such as to give the so-called "bucking motors" arrangement.

For the purpose of providing a full disclosure of the nature and functions of the invention, it is necessary to describe at least generally the following characteristics and conditions involved in the braking of street cars. For many years street cars have depended upon air brakes as the main means of stopping them. It has also been the practice at all times in the past to reverse the driving motors of the vehicle as an additional means of braking in cases of extreme emergency. However, this latter procedure was resorted to only in extreme cases because of the severe effect on the motors and because it did not provide a really reliable or uniform braking means. In this reversing process the motors were electrically connected together in pairs so as to oppose each other; no current was supplied from the line in an endeavor to cause them to rotate in a reverse direction. It is a matter of fact that if two motors of the same type and similar characteristics are rotating in the same direction and they are electrically connected together one will act as a generator and will produce a current that attempts to make the other motor revolve in the opposite direction to that in which both motors are revolving. This condition results even though the motors are supposedly of the same size, characteristics and ratings. This connection is commonly known as the "bucking motors" connection.

Obviously, at any speed above a few revolutions per minute, such electrical cross-connecting of the motors results in a very high current or a very high voltage, or both, through the motors and produces a very severe braking action which may actually cause damage to the motors in both their mechanical and electrical parts. Likewise, the severity of this braking action, which at times is highly erratic, may produce undesirably rapid changes in the velocity of the vehicle, rendering it impractical for obvious reasons, except as an emergency measure. Further motors so interconnected will act as a brake for only one direction of car motion, and if changed so as to produce braking for an opposite direction of vehicle motion they will no longer produce braking for the original direction of vehicle motion.

Likewise in the past means have been provided whereby the motors of a street car can be electrically cross-connected in a manner to include a resistance in the circuit which is intended to control the currents produced by the motors by means of rather complicated apparatus intended to progressively reduce the amount of resistance in the circuit as the car approaches a stop, thereby to provide a uniform braking action down to a certain minimum speed entirely independent of the air brakes.

With these arrangements as now used the dynamic braking action thus resulting is used to very substantially reduce the speed of the car to be followed by a small amount of air braking used solely for the purpose of bringing the car to a final stop. In addition, there is some times used with such arrangements a magnetic track brake, all of which systems in addition make it possible to obtain very high rates of retardation both from high car speeds as well as from low car speeds. Such systems, however, are exceedingly complicated and expensive not only to construct and install but to maintain in operation. In addition the system has the exceedingly undesirable characteristic of a noticeable change in retardation at the time of change over from one means of braking to the other.

In a general way it is an object of this invention to gain the advantages of dynamic and air braking used conjointly at all times in a simple combination of elements, which is relatively inexpensive to construct, install and maintain without the undesirable characteristics of such systems as those disclosed above.

To further fully understand the full nature and scope of this invention it is desirable to point out that the maximum braking that can be applied to any vehicle through the wheels is dependent upon the coefficient of friction between the wheels and the surface on which they are rolling. In the case of street car wheels on rails, the coefficient of friction between a wheel and the rail, or as it is more commonly called the factor of adhesion, has a numerical value which rarely exceeds 0.25. The meaning of this factor is that the maximum retarding force in pounds horizontally which can be applied through the wheels to the vehicle running on level, tangent track without causing the wheel to slip on the rail is 0.25 times the force with which the wheel presses on the rail. Of course, by means of sand and under exceptionally good conditions this factor may rise as high as 0.33 but for general purposes it is assumed to be 0.25 maximum and it is to be noted that when very bad conditions exist, such as mud or grease on the rails, this value may fall to almost nothing.

It should next be considered that between the brake shoe and the wheel the coefficient of friction rarely exceeds 0.2 and this only at very low wheel speeds. With the large wheel tread surface and the comparatively small brake shoe surface severe applications of the brakes with the resultant heavy pressure between the brake shoe and the wheel cause the shoe to heat up very rapidly. The result is then that the coefficient of friction falls off quite rapidly. Thus, due to the surface of the shoe becoming practically molten, where ordinarily there is a coefficient of friction between the wheel and the rail of at least 0.2 at all speeds of the wheel, the coefficient of friction between the shoe and the wheel rarely exceeds 0.2 at very low speeds and if the brake is applied when the car speed and wheel speed is high, say thirty miles per hour, the coefficient of friction between the wheel and the shoe becomes almost instantaneously less than 0.1.

With these facts in mind, it becomes evident that if the brake shoe is applied to the wheel at high car speed with a given force the retardation of the wheel will not be nearly as rapid as when the shoe is applied to the wheel at very low car speed with the same force. In other words, if a test is made on the car on which the brake shoe is applied to the wheel at some high speed, say thirty miles per hour, and that force is maintained, it will be found that the retardation of the car will increase rapidly as the car slows down. The effect of this is that the car will decelerate at an increasing rate.

Obviously, the maximum pressure that can be applied by the brake shoe to the wheel must not result in the coefficient of friction between the shoe and the wheel exceeding that between the wheel and the rail for otherwise the wheel will stop and slide on the rail. It has been found from experience that as soon as a wheel slides on the rail the coefficient of friction between them rapidly decreases and the wheel sliding on the rail becomes a very ineffective brake. It is, therefore, obvious, that the force applied between the brake shoe and the wheel is limited to that which can be applied without wheel-sliding at low wheel speed, unless special apparatus is available which will automatically reduce the braking force created by the air brake system as the car speed decreases. Such apparatus is available but has proved complicated, unsatisfactory and expensive.

Considering the action which occurs when a dynamic brake application occurs it is evident that the action is the exact reverse of what occurs when the air brake is applied. If the motors are electrically connected together in pairs, and especially if the armatures and fields are interchanged, it is obvious that the higher the car speed, up to a certain limit, the greater will be the current and voltage interacting between the motors and the more effectively and the more powerfully the motors will attempt to stop the vehicle whereas at low car speed the motors rotating slower produce very little current and voltage and, consequently, provide very little resistance to the car motion. Further, due to the particular method of interconnecting the motors, as disclosed, both motors of a pair tend to function as generators and the wheels driven by each motor therefore function to retard the vehicle motion.

It is in view of these facts that the combination of the invention herein disclosed is possible. By the combined use of dynamic and air braking systems their opposed characteristics may be combined to provide a resulting braking force which is much more nearly constant for all vehicle speeds. It is a desirable and possibly necessary condition in the use of a combination of this type in accordance with this invention to provide permanent resistance in the circuits of the cross-connected motors to prevent excessive overloading of them at high car speeds and to more effectively attain a substantially constant braking action at all speeds normally encountered in street car operation. With such a combination it is possible, within reasonable limits, to obtain a total braking action which exerts an approximately constant retarding force from high speed all the way down to low speed, and this result can be attained without the necessity of complicated apparatus to vary the air brake pressure or the dynamic braking force as the car speed changes. The fundamental characteristics, as will be more fully explained in connection with the drawings, of these two types of braking systems, are used in accordance with this invention to compensate each other to the greatest possible extent.

Figure 2:
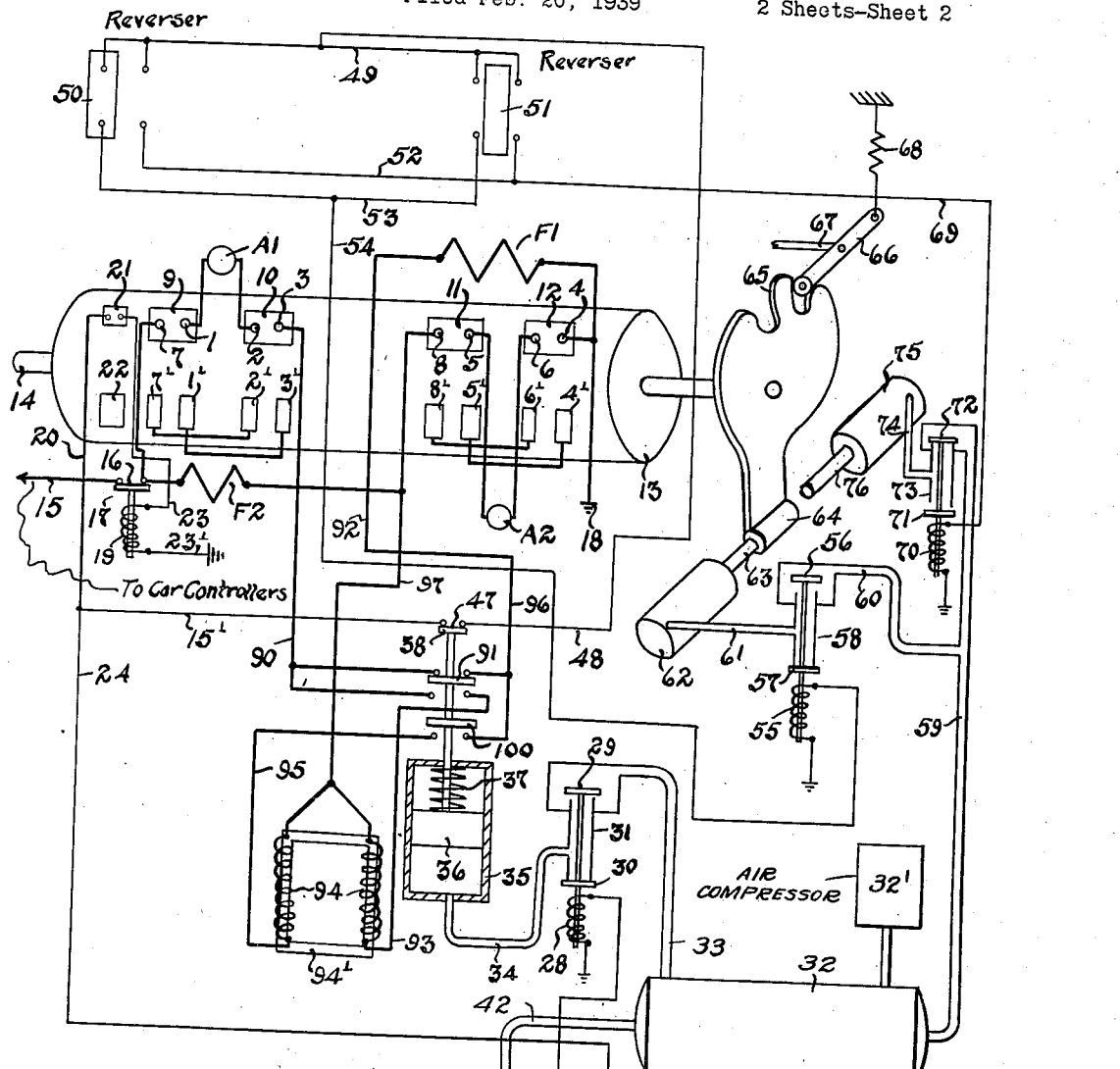

In the accompanying drawings,

Figure 1 is a diagrammatic view of one form of system in accordance with this invention employing an equalizing resistance; and Figure 2 is a similar view of a modified arrangement employing equalizing inductances.

At the outset it is noted that this invention is an improvement upon the invention disclosed in my copending application Serial No. 247,857, filed December 27, 1938 and the continuation in part thereof, Serial No. 294,589, filed September 13, 1939, and in general is related to the subject matter thereof.

In the systems illustrated in the figures there is provided a combined dynamic braking system employing two vehicle driving motors and an air brake system. As the description proceeds it will be obvious that any number of pairs of driving motors of a driven vehicle may be employed for the purposes of this invention.

Referring now to Figure 1, there is shown at 13 the drum of a drum switch, which drum is mounted for rotation on a shaft 14 in suitable bearings, not shown. This drum is provided with two rows of contacts, one row comprising the contacts 21, 9, 10, 11 and 12, and the other the contacts 22, 7', 1', 2', 3', 8', 5', 6', and 4'. Suitably mounted so as to be engaged by the contacts of either row alternately are a series of brushes or contact fingers 7, 1, 2, 3, 8, 5, 6 and 4. At 15 is the current supply wire which in the case of a street car, for example, is the trolley wire, and which runs from the car controller by means of which the vehicle driving motors are controlled. The wire 15 is directly connected to one of the fixed contacts 16. These contacts are adapted to be bridged by a switch blade 17 which is part of a relay operated by a magnet 19. One terminal of the magnet 19 is connected by the wire 23' to ground and the other terminal is connected by the wire 23 to one of the pair of brushes positioned to be alternately engaged by the contacts 21 and 22. The other brush of this pair is connected by wire 20 to the trolley wire 15', which is connected to a suitable current through switch 16' and wire 17'.

The other contact 16 is connected as shown to the brush 7 and one terminal of the field winding F2. The other terminal of the field winding F2 is connected to brush 8 and by wire 78 to one of a pair of contacts controlled by the switch blade 77. One terminal of the field winding F1 is connected to brush 3 and by wire 80 to the equalizing resistance 79 which terminates at the other contact of the pair controlled by the switch blade 77. The other terminal of the field winding F1 is connected to brush 4 and grounded at 18. The armature A1 is connected to the brushes 1 and 2 and the armature A2 is connected to the brushes 5 and 6. At this point it may be noted that in the actual motors the armature A1 rotates in the field F1 and the armature A2 rotates in the field F2. As shown contacts 1' and 3' are connected together, as are contacts 7' and 2'. The corresponding contacts 8' and 6' are connected together and 5' and 4' are connected together.

The wire 20 is connected to one of a pair of fixed contacts 47 controlled by a switch blade 38. Wire 24 provides a separate circuit from the positive side of the current source to one of a pair of fixed contacts 25 controlled by a switch blade 26. The other contact of the pair 25 is connected by wire 27 to a solenoid 28 which is grounded. This solenoid is associated with a valve stem upon which is mounted a pair of opposed valves 30 and 29 cooperating with the seats in a valve 31. A pressure fluid supply source 32, in which the pressure is maintained by an air compressor 32', is connected by pipe 33 to the valve 31 above the seat of valve 29. The space between the two valve seats is connected by a pipe 34 to a cylinder 35 in which is slidably mounted a piston 36. The piston is provided with a piston rod on which are mounted the switch blades 38 and 77. A spring 37 is positioned to urge the piston 36 to a position when switch blade 38 disengages contacts 47 and switch blade 77 engages its contacts. At 39 is shown the air brake control valve which is known in the art in many forms, and in accordance with common practice today it is of the pressure reducing type so that the operator may supply the air brakes with pressure fluid at any desired pressure within its operating range.

The valve 39 comprises a casing having a sliding piston 39' in the lower end actuated through a link by the manual lever 46, shown in the form of a foot pedal. This lever is pivotally mounted intermediate its ends on a suitable support adjacent the valve so that upon clockwise rotation of the lever 46 the sliding piston 39' rises. As illustrated, the casing of the valve is made in several parts and the lowermost pair of parts is secured together with a flexible diaphragm V sealed between them to form a transverse wall. Mounted on the transverse wall is an exhaust valve member 40C which has a passage through it terminating in a seat on its upper end. A compression spring T' is interposed between the slidable piston 39' and the member 40C mounted on the diaphragm D. Resting on a transverse wall integral with the intermediate portion of the valve casing is a valve member 40B which has a portion depending through an opening in the transverse wall and terminating at its lower end in a valve member for cooperation with the seat in the member 40C. As illustrated the transverse wall is constructed so that when valve member 40B rests on it pressure fluid can flow around the valve member 40B. The wall is simply a support for the valve member. The upper portion of the casing is provided with a transverse wall having a seat formed on its upper side which cooperates with a movable valve member 40. A compression spring T'' rests on this valve member so as to normally hold it on this seat. The valve member 40 is provided with a depending stem which, as shown, does not engage the valve member 40B when it rests on the transverse wall and the valve 40 is on its seat. The upper chamber in the valve casing, which is closed by the valve 40 when seated, is connected by pipe 42 to the pressure fluid source 32. The space between the valve 40 and the piston 39' is connected by a pipe 43 to the brake cylinder 44, only one of which is shown in the drawings but a number of which are commonly employed in parallel. The space between the diaphragm V and the slidable piston 39' is open to the atmosphere through the exhaust port 45. A plunger acted on by compression spring 40D engages the lever 46 on the opposite side of its point of pivotal support with respect to the link connecting the slidable piston 39'. The spring 40D is compressed when the lever 46 is in the position shown, which is in its depressed position, at which it is held when the vehicle is progressing and all brakes are released. As soon as the pressure on the left hand end of lever 46 is sufficiently reduced, spring 40D will cause clockwise rotation of the lever, and if the foot is completely removed from the lever spring 40D will move it to its other extreme position, as will be more apparent from the detailed description of the apparatus to be given later. With this arrangement, should the operator for any reason, conscious or unconscious, remove his foot from the lever, all brakes will be fully applied.

The interlock switch of which contacts 16' and 26 are a part includes a rod supported for vertical sliding movement, and on which, contacts 16' and 26 are slidably mounted as shown, but electrically insulated therefrom. Pinned on the rod, in spaced relation, are the collars R, M, P and N. A spring S lies between the contact 26 and the collar M, and similarly, a spring S' lies between the collar N and the contact 16'. This is a well known type of delayed action switch.

The other contact of the pair 47 is connected by a wire 48 to a wire 49 common to the two reversers normally provided in vehicles of this type, one at each end of the car. The reverser at the left hand side of the figure is shown set for forward movement of the vehicle, while the other reverser is in off position, which is the necessary condition for forward movement of the vehicle. The opposed contacts of the reversers are connected as shown by the wires 52 and 53. At 50 and 51 are the movable contacts of the reversers for setting up the proper connections in accordance with well known practice. Wire 53 is connected by wire 54 to a solenoid 55 which is grounded. This solenoid cooperates with a valve stem having a pair of opposed valves 56 and 57 mounted thereon. These valves cooperate with the seats in the valve casing 58. The space above the upper seat is connected by the pipes 60 and 59 to the reservoir 32. The space between the seats of the valve is connected by a pipe 61 to a cylinder 62 similar to the cylinder 35. The cylinder 62 has a sliding piston therein which is provided with the projecting piston rod 63. Wire 52 is connected by wire 69 to a solenoid 70 which is grounded. The valve stem cooperates with this solenoid and has mounted thereon a pair of opposed valves 71 and 72. These valves cooperate with seats in a valve casing 73 and the upper part of the valve is connected to the pipe 59. The space between the valve seats is connected by a pipe 74 to a cylinder 75 and like the cylinder 62 is provided with a piston and a piston rod 76. The piston rods 63 and 76 cooperate with an arm 64 on a cam or latch member 65 secured to the shaft 14 for movement with the drum. The cam portion is so shaped as to cooperate with a lever 66 pivotally mounted on a pivot 67 and controlled by a spring 68 to hold the lever in the position shown. The camming surface is so shaped as to cooperate with lever 66 so that for either position of the drum the lever 66 merely acts to hold the drum in the position to which it is operated by one of the piston rods 63 and 67, and when it is operated towards the reverse position by the other, it goes all the way to this reverse position, or returns all the way to its original position in the event of any failure on the part of the piston rods to complete their full stroke.

The system of Figure 2 will be first described before the operation of either system is given. Many of the parts of the two systems are the same and have been given the same reference numerals. The description of the apparatus of Figure 2 will not be repeated wherein it is the same as that of Figure 1. The main differences consist in the fact that the piston rod of the piston 36 is provided with two switch blades 91 and 100 in place of the switch blade 77 of the previous arrangement. Switch blade 91 cooperates with an upper and lower pair of contacts while switch blade 100 cooperates with a lower pair. In this arrangement brush 3 is connected to one contact at each of the upper and lower pairs controlled by the switch blade 91 at the wire 99. The other contact of the upper pair is connected by wire 96 to one terminal of the field winding F1 and to one contact of the pair controlled by switch blade 100. Brush 8 in addition to being connected to one terminal of the field winding F2 is connected by wire 97 to a common terminal for a pair of inductances 94 having a common core 94'. The other terminal of one of the inductances is connected by wire 93 to the other contact of the lower pair controlled by switch blade 91. The other contact of the other inductance is connected by wire 95 to the other contact of the pair controlled by switch blade 100. Otherwise the apparatus and connections are the same as those previously described.

The operation of the two systems will now be described in detail. In the arrangement of Figure 1 it is understood that the system is shown in the condition where the vehicle operator has his foot on the lever 46 so that the brake cylinder 44 is open to exhaust through port 45 and the brakes are released and switch blades 26 and 16' engage their cooperating contacts. The result is that solenoid 28 is energized from wire 24, switch 26 and wire 27. Thus valve 30 is seated and valve 29 is unseated, with the result that pressure fluid is supplied from the reservoir 32 through pipe 33, valve 31 and pipe 34 to cylinder 35. Hence the piston 36 is in the position shown with spring 37 compressed. Switch 38 is closed and switch 77 is open. Current then flows from wire 17' through switch 16', wire 15', switch 38, wire 48, wire 49, contact 50, wire 53, wire 54 and solenoid 55 to ground. As a result of the energization of the solenoid 55 valve 57 is seated and valve 56 is unseated. Pressure fluid flows from reservoir 32 through pipe 59, pipe 60, valve 58, and pipe 61 to cylinder 62. The piston of this cylinder is moved so as to project piston rod 63 and move drum 13 to the position shown. Lever 66 locks these two parts in this position. Solenoid 70 not being energized, valve 72 is seated and hence cylinder 75 is open to exhaust through pipe 74 and valve 71. Current also flows from wire 15' to wire 20, switch 21 and wire 23 to ground through wire 23' and solenoid 19. Thus switch 17 is closed. The vehicle is now in condition to be driven in a forward direction by its operating motors when the operator manipulates the car controller. When he manipulates the car control to start the vehicle he completes a circuit from the controller through wire 15 and switch 17.

At this point it may be noted, as will be readily appreciated by those skilled in the art, that all of the usual adjuncts to driving motor control for vehicles may be used in conjunction with this system. It has been shown in its simplest form for the purposes of emphasizing the novel subject matter of this invention.

Current under the above condition flows from the trolley 15 through switch 17, brush 7, contact 9, brush 1, armature A1, brush 2, contact 10, brush 3, field F1 to ground at 18. It also flows through F2, brush 8, contact 11, brush 5, armature A2, brush 6, contact 12 and brush 4 to ground at 18. Thus the two series driving motors are connected between trolley and ground in parallel. This provides, of course, the normal operating connections for the vehicle motors.

The control of the brakes rests with the operator and he may make either a full service application, in which case he would allow the pedal of the self-lapping brake valve 39 to rise to its highest position and would do nothing further until the car stopped, or he might choose to partially apply the air brakes and partially or totally release them before the car came to a stop. Assuming in the first place that he intends to make a stop without any attempt to graduate the braking, the following would occur. He would remove his foot from brake pedal 46, thereby allowing spring 40D to raise foot pedal 46. As pedal 46 rises, the rod of interlock switch begins to fall and when the pedal 46 has risen about 1½ inches from the bed plate of the self-lapping brake valve 39, collar P comes in engagement with contact 16' and causes it to open, thereby interrupting the circuit between wire 15' and wire 17' and thereby, as previously described, causing line switch coil 19 to become de-energized and disconnecting the source of power from the controller and car motors. This first upward portion of the travel of foot pedal 46 represents the "power zone." As the pedal continues upwards, the rod of the interlock switch, which also carries contact 26, continues to fall, but spring S keeps contact 26 in closed position and maintains connection between wire 24 and wire 27. This situation remains unchanged for approximately another 1½ inches of travel upwards of the foot pedal 46 and this represents the "coasting zone," within which zone the car cannot have power applied to the motors, nor are the brakes applied. Consequently, the car is free to "coast" if it is moving. As foot pedal 46 continues to rise beyond this second zone into the third and final or "braking zone," it compresses spring T in self-lapping brake valve 39 which, in turn, moves exhaust valve 40C upwards by bending flexible diaphragm V. Exhaust valve 40C almost instantly comes in contact with valve 40B thereby closing the exhaust passage through valve 40C to atmosphere through opening 45 in the casing of the self-lapping brake valve 39. A further small upward motion of the exhaust valve 40C carries the valve 40B into contact with the stem of application valve 40, whereupon application valve 40 is opened, allowing air from reservoir 32 to flow through pipe 42, past application valve 40, into pipe 43 and thence into brake cylinder 44. Simultaneously with the opening of application valve 40, the rod of interlock switch will have fallen far enough, due to the continued motion of foot pedal 46, to cause collar R on this shaft to engage contact 26 and carry it downwards along with the shaft, thereby opening circuit from wire 24 to wire 27. Interruption of supply circuit to wire 27 de-energizes magnet coil 28, allowing valve 30 to open and valve 29 to close, whereupon the air under piston 36 in air switch 35 is permitted to escape to atmosphere through pipe 34, past valve 30. Spring 37 then operates to close switch 77, connecting the resistance 79 across the motors to give dynamic braking. In other words, at the same moment that air begins to enter the brake cylinder, the dynamic brake is applied. Since the upward motion of foot pedal 46 is still unrestricted, it will continue upwards to the limit of travel of spring 40D and air will continue to flow into the brake cylinder through the self-lapping brake valve until the pressure in brake cylinder 44 becomes equal to the pressure of spring T operating through diaphragm V, at which time, despite the fact that the foot pedal 46 is in its maximum upward position, the air pressure in reservoir 42 will be sufficient to cause spring T to compress to such a point that application valve 40 closes. The brake cylinder will then have in it the maximum air pressure that can be balanced by spring T and the system will stand in that condition, with maximum air brake application and maximum dynamic brake application, until the car has stopped and indefinitely thereafter.

As is well understood by those familiar with pressure reducing valves of the type herein disclosed, the maximum air brake application that can be made is predetermined by the strength of the spring T, or when structural provision is made therefor, for the adjustment of the tension thereon, by that adjustment. Thus the limits of air brake application pressure may be predetermined by the initial loading of spring T, and for any predetermined loading the air brake pressure may then be varied between zero and the maximum for which the spring is adjusted. This is, of course, all well known, and indeed inherent in pressure reducing or self-lapping valves of the type herein disclosed.

If we now assume the other operating condition, wherein the operator does not desire a full brake application, it will be noted that the sequence of events will be identical with that described above, except that the operator will not allow foot pedal 46 to rise to its maximum height. He will stop it somewhere in zone 3, referred to above. Obviously, the farther he allows the foot pedal 46 to travel upward into zone 3, the greater will be the compression of spring T and the greater will be the air pressure in the brake cylinder that can be passed from reservoir 42. However, it will be noted that the dynamic brake has been fully applied and the operator has no control over the quantity of dynamic braking obtained. It will depend entirely upon the speed of the car. Obviously, the operator can so manipulate foot pedal 46 that he will perhaps put no more than 5 lbs. of air into brake cylinder, in which case practically all of the braking will be obtained from the dynamic brake. If he finds this amount of braking inadequate for his purpose, he merely allows foot pedal 46 to rise somewhat, in which case, due to the increased pressure resulting therefrom on spring T, he will obtain a higher air pressure in the brake cylinder and consequently increased air braking, due solely to an increase in the air braking force. Obviously also if, as the car slows down, he decides that it is slowing more rapidly than necessary, he can, by putting pressure on foot pedal 46, depress it somewhere within zone 3 and thereby reduce the pressure of spring T, whereupon the brake cylinder pressure in pipe 43 will be sufficient to depress diaphragm V and, as exhaust valve 40B can only follow exhaust valve seat 40C for a limited distance, air will escape through exhaust valve 40C and opening 45 to atmosphere. The pressure in the brake cylinder will thereby continue to fall until it is again balanced by spring T, whereupon spring T will raise diaphragm V and exhaust valve 40C until it engages valve 40B, preventing further reduction in air pressure in brake cylinder for that particular position of foot pedal 46.

It is, therefore, apparent that full dynamic braking results whenever the operator makes a brake application, and that it is within his power to obtain as much or as little air brake within the pressure calibration of spring T as he may desire, and, having obtained such air brake, to release as much or as little of said air brake as he desires.

The combination of this air brake and dynamic brake is, in any practical installation, obviously so designed that the retarding force resulting from the dynamic brake at the wheels at high speed plus the retarding force obtained at the wheels at the same speed from air brake pressure, both under average rail condition, is slightly less than the force required to slip the wheels at this car speed. As previously explained, it then should also become obvious that at any lower car speed than this highest probable speed, the total combined air brake retarding force and dynamic brake retarding force will always remain less than the retarding force required to slip the wheels on the rail, because the dynamic brake retarding force automatically reduces at least as rapidly as the air brake retarding force automatically increases (when left fully applied) as the car speed reduces.

It will be seen that when the two motors are cross-connected that with the vehicle driving them they act as generators to provide dynamic braking which is equalized with respect to the different sets of wheels to which the motors are respectively connected because of the shunted resistance 79 which permits equalizing currents to flow in the two motor circuits. This is an important practical consideration because of the fact, as is well known, that motors of this type even when superficially of the same size and characteristics, do not behave the same electrically under these conditions. However, this fact is accounted for by the shunt resistance 79 which insures a dynamic balanced braking action from both of the motors.

An important feature of the invention is the fact that the reverser switches 50 and 51 which control the position of the drum switch 13, control the operating mechanism for the drum switch 13 through the switch 38 which is always open at the time the brakes are applied. The result is that the vehicle operator cannot inadvertently reverse the position of the drum switch 30 by accidentally moving the reversers 50 and 51 while dynamic braking is taking place.

This is an important feature of the invention because with the arrangement illustrated if a vehicle for any reason such as the failure of some part of the air braking equipment should attempt to run downhill backwards, the two driving motors connected in series in opposition with or without the resistance 79 shunted across them now act as "bucking motors." Thus, whereas with the connection shown for the forward movement of the vehicle the two motors act as generators to produce dynamic braking, they on reverse motion of the vehicle provide a "bucking motor" arrangement. This results because of the fact that the residual magnetism in the fields acts to provide a generator action. This generator action will be greater in one motor than in the other, depending upon which has the greater residual magnetism, with the result that it will supply current to the other motor, making it act as a motor and causing it to tend to rotate in a direction opposite to that due to the car motion, thereby providing a very effective brake at low speed.

Another important advantage of this system is that upon failure of the control circuits through the wire 15' the same actions will result. Thus the vehicle is provided at all times with dynamic braking for forward motion and "bucking motor" action for reverse movement. The same advantages result if the air brake system should fail for any reason so that the vehicle is always provided with an effective brake for either direction of movement.

For normal operation of the vehicle in a direction reverse to that previously assumed and called forward motion, the operation simply moves the reverser switch 50 to central position, removes the detachable reverse key, goes to the other end of the car, places the key on the reverser at that end, moves reverser switch 51 to forward position, with the result that solenoid 70 comes into play and solenoid 55 is cut out. As soon as the reversers are thus positioned for opposite movement of the vehicle, solenoid 70 is energized supplying air to cylinder 75 which acts to move the cam member 64—65 to its other position where it is held as before by lever 66. At this time the drum switch is moved so that the brushes engage the contacts 22, 7', 1', 2", 3', 8', 5', 6' and 4', whereupon the circuits are all set up for reverse movement of the car. Under these conditions the vehicle has dynamic braking and "bucking motor" braking as before in its new direction of motion.

The system of Figure 2 is broadly the same as that of Figure 1. The main difference consists in that instead of shunting a resistance across the two motors connected in series and in opposition a pair of inductances 94 are shunted across them at the time of dynamic braking. These inductances 94 are linked with the magnetic core 94' with the result that the two motor circuits resulting from such a connection instead of being linked by an equalizing resistance are linked by a pair of magnetically coupled inductances whereby compensation is secured through the magnetic fields induced in the core. In other words, when the operator releases lever 46 to apply the air brakes he cuts off the motors, takes the control of the reverses 50 and 51 away from drum switch 13 and connects the inductances 94 across common terminals of the motors whereby dynamic braking is simultaneously applied with air braking, and in a case of the roll back of the car the "bucking motor" action will occur, regardless of whether the inductances are in the circuit.

From the above description it will be apparent to those skilled in the art that the invention herein disclosed is subject to numerous modifications without departure from the novel subject matter herein disclosed. I do not, therefore, desire to be strictly limited to the disclosure as given in an illustrative sense, but rather to the scope of the appended claims.

What I seek to secure by United States Letters Patent is:

1. In a combined dynamic and air brake system for vehicles, the combination including a pair of electric drive motors for the vehicle, normal operating and control circuits for said motors for connecting them in parallel across a power supply including a two position switch whereby the motors may be operated in opposite directions depending upon which position said switch is in, air brakes for said vehicle, means interlocked so as to be operated with said air brakes for connecting an impedance in shunt across points between the armature and field of each motor whenever the brakes are applied, means for actuating said two position switch to either of its two positions, and means operated with said air brakes for rendering said last mentioned means inoperative whenever the brakes are applied.

2. In a combined dynamic and air brake system for vehicles, the combination including a pair of electric drive motors for the vehicle, normal operating and control circuits for said motors for connecting them in parallel across a power supply including a two position switch whereby the motors may be operated in opposite directions depending upon which position said switch is in, air brakes for said vehicle, means interlocked so as to be operated with said air brakes for connecting an impedance in shunt across points between the armature and field of each motor when the brakes are applied, fluid pressure operated means for actuating said two position switch to either of its two positions, manually actuated means for controlling said operating means, and means for disconnecting said manually actuated means whenever the brakes are applied.

JOHN S. McWHIRTER.